(12) United States Patent
Diehl et al.

(10) Patent No.: US 9,210,137 B2
(45) Date of Patent: Dec. 8, 2015

(54) LOCAL DIGITAL NETWORK, METHODS FOR INSTALLING NEW DEVICES AND DATA BROADCAST AND RECEPTION METHODS IN SUCH A NETWORK

(75) Inventors: Eric Diehl, Liffré (FR); Jean-Pierre Andreaux, Rennes (FR); Alain Durand, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1873 days.

(21) Appl. No.: 10/487,489

(22) PCT Filed: Aug. 23, 2002

(86) PCT No.: PCT/FR02/02928
§ 371 (c)(1), (2), (4) Date: Feb. 23, 2004

(87) PCT Pub. No.: WO03/019899
PCT Pub. Date: Mar. 6, 2003

(65) Prior Publication Data
US 2005/0278524 A1    Dec. 15, 2005

(30) Foreign Application Priority Data

Aug. 24, 2001 (FR) .................. 01 11078

(51) Int. Cl.
*H04L 29/06* (2006.01)
*H04N 7/167* (2011.01)
(Continued)

(52) U.S. Cl.
CPC .......... *H04L 63/0435* (2013.01); *H04L 9/0822* (2013.01); *H04L 63/0428* (2013.01);
(Continued)

(58) Field of Classification Search
CPC ................................................ H04L 63/0435
USPC .......... 713/168–170, 189, 150, 181; 380/277–278, 210, 211, 280; 725/31; 705/51
See application file for complete search history.

(56) References Cited

U.S. PATENT DOCUMENTS 4,694,491 A * 9/1987 Horne et al. ............. 380/239
4,980,913 A * 12/1990 Skret ....................... 713/153
(Continued)

FOREIGN PATENT DOCUMENTS

CN  1167304    12/1997
EP  0382296    2/1990
(Continued)

OTHER PUBLICATIONS

Popek et al.; Encryption and Secure Computer Networks; Published in: Journal ACM Computing Surveys (CSUR) Surveys Homepage archive; vol. 11 Issue 4, Dec. 1979; pp. 331-356; ACM Digital Library.*

(Continued)

*Primary Examiner* — Bradley Holder
(74) *Attorney, Agent, or Firm* — Myers Wolin LLC

(57) ABSTRACT

The invention relates to a local digital network comprising:
at least one source device intended to broadcast data over the network; and
at least one receiver device intended to receive said data.
The source device uses a network active encryption key to encrypt data liable to be broadcast in the network and the receiver device contains:
a network active decryption key for decrypting data encrypted using said active encryption key and
at least one decryption key of the network for decrypting data encrypted with the aid of an encryption key used previously in the network.
The invention also relates to the installing of new devices in such a network as well as the sending of data from a source device to a receiver device.

1 Claim, 1 Drawing Sheet

(51) Int. Cl.

| | | |
|---|---|---|
| *H04N 21/418* | (2011.01) | |
| *H04N 21/434* | (2011.01) | |
| *H04N 21/436* | (2011.01) | |
| *H04N 21/4367* | (2011.01) | |
| *H04N 21/4405* | (2011.01) | |
| *H04N 21/4408* | (2011.01) | |
| *H04N 21/4623* | (2011.01) | |
| *H04L 9/08* | (2006.01) | |
| *H04L 9/32* | (2006.01) | |

(52) U.S. Cl.
CPC ......... *H04N7/1675* (2013.01); *H04N 21/4181* (2013.01); *H04N 21/4345* (2013.01); *H04N 21/4367* (2013.01); *H04N 21/43615* (2013.01); *H04N 21/4405* (2013.01); *H04N 21/4408* (2013.01); *H04N 21/4623* (2013.01); *H04L 9/088* (2013.01); *H04L 9/3239* (2013.01); *H04L 2209/601* (2013.01)

(56) References Cited

U.S. PATENT DOCUMENTS

| | | | | |
|---|---|---|---|---|
| 5,406,627 | A * | 4/1995 | Thompson et al. | 380/237 |
| 5,663,896 | A * | 9/1997 | Aucsmith | 713/163 |
| 5,708,961 | A * | 1/1998 | Hylton et al. | 725/81 |
| 5,740,075 | A * | 4/1998 | Bigham et al. | 709/229 |
| 5,748,736 | A * | 5/1998 | Mittra | 713/163 |
| 5,915,025 | A | 6/1999 | Taguchi et al. | |
| 6,014,442 | A | 1/2000 | Enari | |
| 6,363,149 | B1 * | 3/2002 | Candelore | 380/45 |
| 6,393,565 | B1 * | 5/2002 | Lockhart et al. | 713/172 |
| 6,496,928 | B1 * | 12/2002 | Deo et al. | 713/153 |
| 6,819,766 | B1 * | 11/2004 | Weidong | 380/277 |
| 6,868,407 | B1 * | 3/2005 | Pierce | 705/60 |
| 7,072,865 | B2 * | 7/2006 | Akiyama | 705/51 |
| 7,073,073 | B1 * | 7/2006 | Nonaka et al. | 713/193 |
| 7,149,308 | B1 * | 12/2006 | Fruehauf et al. | 380/44 |
| 7,224,795 | B2 * | 5/2007 | Takada et al. | 380/42 |
| 7,257,227 | B2 * | 8/2007 | Chen et al. | 380/211 |
| 7,434,046 | B1 * | 10/2008 | Srivastava | 713/163 |
| 7,848,521 | B2 * | 12/2010 | Leporini et al. | 380/241 |
| 2002/0077988 | A1 * | 6/2002 | Sasaki et al. | 705/59 |
| 2003/0097563 | A1 * | 5/2003 | Moroney et al. | 713/170 |
| 2003/0108206 | A1 | 6/2003 | Diehl et al. | |
| 2006/0140411 | A1 * | 6/2006 | Zhu | 380/277 |

FOREIGN PATENT DOCUMENTS

| | | |
|---|---|---|
| EP | 382196 | 8/1990 |
| FR | 2824212 | 10/2002 |
| WO | WO 00/31956 | 6/2000 |
| WO | 00/62505 | 10/2000 |
| WO | WO 00/62540 | 10/2000 |

OTHER PUBLICATIONS

Smid et al.; Data Encryption Standard: past and future; Published in: Proceedings of the IEEE (vol. 76, Issue: 5); pp. 550-559; Date of Publication: May 1988; IEEE Xplore.*

* cited by examiner

LOCAL DIGITAL NETWORK, METHODS FOR INSTALLING NEW DEVICES AND DATA BROADCAST AND RECEPTION METHODS IN SUCH A NETWORK

This application claims the benefit, under 35 U.S.C. 0365 of International Application PCT/FR02/02928, filed Aug, 23, 2002, which was published in accordance with PCT Article 21(2) on Mar. 6, 2003 in French and which claims the benefit of French patent application No. 0111078, filed Aug. 24 2001.

FIELD OF THE INVENTION

The present invention relates in a general manner to the field of local digital networks and more particularly to the field of domestic digital networks. It is more precisely concerned with protection against the copying of the digital data flowing around such networks.

STATE OF THE ART

Such a network consists of a collection of devices linked together by a digital bus, for example a bus according to the IEEE 1394 standard. It comprises in particular two types of device:
Source devices capable of sending data over the network: these devices can recover the data through a "channel" external to the network.
Receiver devices, suitable for receiving the data flowing over the network, so as to method them or present them to the user.

Thus, taking the example of a domestic digital network intended for conveying audio and/or video data into various rooms of a house, the source devices are, for example, digital decoders receiving video programs from outside the network, via a satellite antenna or via a cable connection, or else optical disk readers transmitting over the network, in digital form, data (audio and/or video) read from a disk (in this case the disk contains data originating from outside the network). The receiver devices are, for example, television receivers making it possible to view video programs received from the network or, more generally, any type of appliance having the capacity to decrypt encrypted data.

From the standpoint of content providers who provide the data originating from outside the local network, in particular service providers transmitting pay-TV programs or else optical disk publishers for example, it is necessary to prevent these transmitted data from being copied and from flowing easily (for example by being copied onto an optical disk or any other recording medium) from one local network to another.

To do this, it is known practice to transmit the data in secret form by encrypting them with the aid of cryptography algorithms using keys which are known beforehand to the appliances authorized to receive these data or else which are exchanged according to particular secure protocols between the content provider and these appliances.

The French patent application filed on Apr. 13, 1999, in the name of THOMSON multimedia, and published under the reference FR-A-2 792 482, relates to a domestic network in which a public key specific to the network is used to encrypt the data flowing between appliances of the network, typically from the previously mentioned source devices to receiver devices. Only the receiver appliances of this network possess the private key corresponding to the public key. Since the (public key, private key) pair is specific to the network, data encrypted within the framework of this network cannot be decrypted by appliances of another network.

French patent application No. 01 05568, filed on Apr. 25, 2001 in the name of the Applicant THOMSON Licensing S.A. relates for its part to a method for managing keys in a network such as above essentially using symmetric keys. The source devices encrypt the data with the aid of a first very frequently renewed symmetric key and they send this first key to the other appliances of the network in a form encrypted with the aid of a second symmetric key specific to the network. The second symmetric key is contained in the receiver devices.

In the two solutions set forth above, the data are protected by one and the same encryption key (or one and the same private/public pair of keys) specific to the network and by one and the same encryption algorithm. However, it may sometimes be necessary to renew these keys and/or the encryption algorithm used, in particular if the encryption algorithm uses overly short keys or if it is no longer safe, independently of the length of the key, so as to use keys of greater length or a more powerful encryption algorithm. Unfortunately in this case the data recorded previously in the network may no longer be decryptable with the new key and/or the new encryption algorithm.

SUMMARY OF THE INVENTION

The subject of the invention is a local digital network comprising:
at least one source device intended to broadcast data over the network; and
at least one receiver device intended to receive said data.
According to the invention, the source device uses a network active encryption key to encrypt data liable to be broadcast in the network; and the receiver device contains a network active decryption key for decrypting data encrypted using the active encryption key and at least one other decryption key of the network for decrypting data encrypted with the aid of an encryption key used previously in the network.

The local digital network may also comprise one or more of the following characteristics:
the receiver device contains all the network's decryption keys used previously since the creation of the network;
the source device contains the network active encryption key and it encrypts the data liable to be broadcast in the network with this active key of the network;
the source device contains a first symmetric key as well as this first symmetric key encrypted with the network active encryption key; it encrypts the data liable to be broadcast in the network with the first symmetric key and it is adapted for transmitting, with the encrypted data, the first symmetric key encrypted with the network active encryption key;
the source device and the receiver device use symmetric encryption methods and the encryption keys and the corresponding decryption keys used in the network are identical.

The invention also relates to a method for installing a new receiver device in a local digital network as hereinabove already comprising at least one receiver device. According to this method, a preexisting receiver device of the network, possessing the network active decryption key and at least one decryption key used previously in the network and having the capacity to send them in a secure manner, sends said decryption keys to the new receiver device.

Another aspect of the invention relates to a method for installing a new source device in a local digital network as hereinabove in which the source device and the receiver device use symmetric encryption methods and the encryption keys and the corresponding decryption keys used in the network are identical. According to this method, a preexisting receiver device of the network, possessing the network active encryption/decryption key and at least one encryption/decryption key used previously in the network and having the capacity to send them in a secure manner, sends the network active encryption/decryption key to the new source device.

The invention also relates to a method for transmitting data by a source device linked to a network as hereinabove in which the encryption keys and the decryption keys used are identical. This method consists in encrypting the data with the aid of the network active encryption/decryption key; and in transmitting the encrypted data along with a fingerprint of the active key, the fingerprint being calculated with the aid of a one-way function applied to the active key of the network.

The invention also relates to a method for receiving encrypted data in a receiver device linked to a network as mentioned above, said data having been broadcast according to the method described hereinabove and the receiver device furthermore containing a fingerprint of each encryption/decryption key that it contains, calculated with the aid of a one-way function applied to said key. The method consists in extracting a key fingerprint from the data received; in comparing the extracted fingerprint with the fingerprints of the encryption/decryption keys contained in the receiver device; and in the case of equality between the extracted fingerprint and one of the fingerprints stored in the receiver device, in decrypting the data with the key corresponding to said fingerprint.

The invention also relates to another method for transmitting data by a source device linked to a network as mentioned above. This method consists in: (a) applying a one-way function to a first part of the data; (b) encrypting the result of the calculation performed in step (a) and a second part of the data to be protected with the aid of the network active encryption key; and (c) transmitting said data encrypted in step (b) as well as the first part of the data over the network.

The invention also relates to a method for receiving data, broadcast according to the method above, in a receiver device linked to a network as described above. The method consists in: (a) applying a one-way function to a first part of the nonencrypted data; (b) decrypting a second part of the data with the aid of a network decryption key contained in the receiver device; and (c) comparing the result of the decryption of a portion of the data decrypted in step (b) with the result of the calculation performed in step (a) so as:

in the case of equality, to recover the remaining portion of the data decrypted in step (b); and in the case of difference, to return to step (b) to perform the decryption of the second part of the data with the aid of another network decryption key contained in the receiver device.

The invention furthermore relates to a third method for transmitting data by a source device linked to a network as described above. The method consists in encrypting the data with the aid of the network active encryption key; and transmitting said encrypted data as well as an index corresponding to the active key of the network.

A method for receiving data, broadcast according to the method above, in a receiver device linked to a network as mentioned above, consists in extracting from the data received an index corresponding to the network encryption key used to encrypt said data; in deducing the corresponding network decryption key from this index; and in decrypting the data with the aid of the decryption key.

BRIEF DESCRIPTION OF THE DRAWINGS

Other characteristics and advantages of the invention will become apparent through the description of several nonlimiting particular exemplary embodiments made explicit with the aid of the appended figures, in which.

DETAILED DESCRIPTION OF EMBODIMENTS OF THE INVENTION

Figure 1:
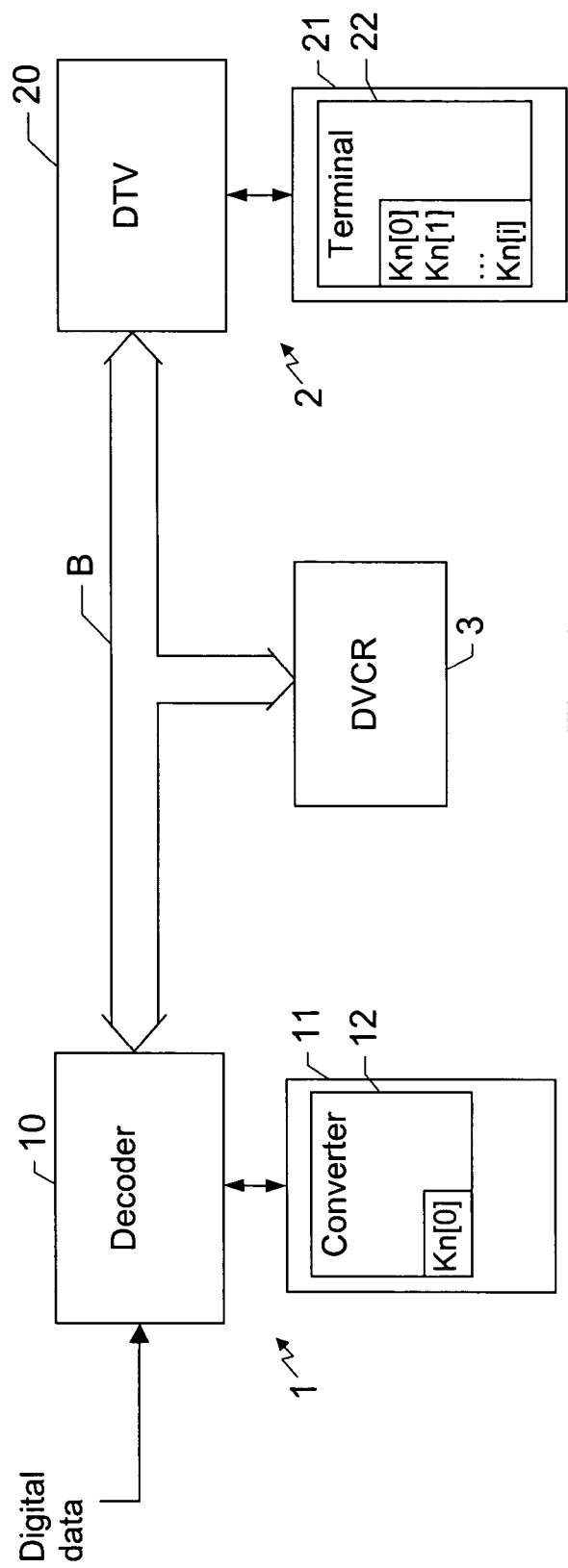
FIG. 1 diagrammatically represents a network according to the invention.

In FIG. 1, we have represented in a diagrammatic manner an exemplary domestic digital network in which the data are protected against copying by using the principles described in the aforesaid patent applications (Application FR-A-2 792 482 in the name of THOMSON multimedia and Application FR No. 01 05568 in the name of THOMSON Licensing S.A.) to which reference may be made for further details.

The network comprises a source device 1, a receiver device 2 and a recording device 3 that are linked together by a digital bus B, which is for example a bus according to the IEEE 1394 standard.

The source device 1 comprises a digital decoder 10 fitted with a smart card reader furnished with a smart card 11. This decoder receives digital data, in particular of audio/video programs distributed by a service provider.

The receiver device 2 comprises a digital television receiver (DTV) 20 fitted with a smart card reader furnished with a smart card 21 and the recording device 3 is in particular a digital video recorder (DVCR).

The digital data that enter the network via the source device 1 are generally data scrambled according to the principle of pay-TV. The data are scrambled with the aid of control words (CW) that are themselves sent in the data stream in a form encrypted with the aid of an encryption key K and are contained in control messages (ECM, standing for Entitlement Control Message). The encryption key K is made available to users who have paid to receive the data, in particular by being stored in a smart card. In the example of FIG. 1, it is assumed that the smart card 11 contains such a key K.

The source device 1 which receives these scrambled digital data subsequently shapes them so that they are broadcast over the digital network. To do this, the ECM messages containing the control words encrypted with the aid of the key K are transformed by a converter module 12 contained in the smart card 11 into LECM messages (standing for Local Entitlement Control Message) containing the decrypted control words, the LECM messages being protected with the aid of a key specific to the local domestic network.

Figure 2:
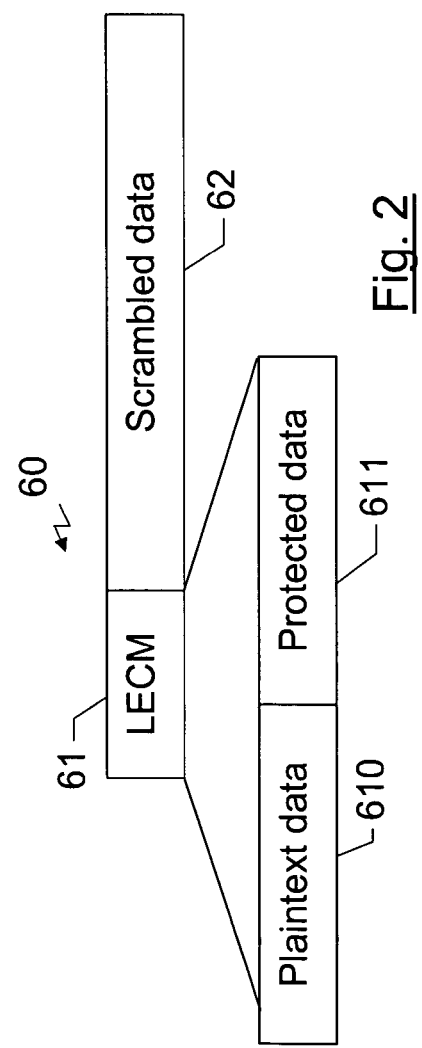
FIG. 2 represents data flowing around this network.

The data that flow around the network are therefore made up of packets 60 as represented in FIG. 2. Such a packet 60 contains: scrambled data 62 and an LECM message 61. The LECM message itself comprises two parts:

a part 610 containing plaintext data, that is to say nonencrypted data. It may in particular be packet headers, of the size of the LECM message, a version number of the copy protection system, etc.; and a part 611 containing protected data, in particular the control words CW.

In what follows, for the sake of simplification, it will be considered that the data protected in the part 611 of the LECM message are encrypted with the aid of a secret key (or symmetric key) of the network Kn. However, the invention applies also as a variant in the case where a more complex system for managing keys is used, such as for example that described in the aforesaid Application FR No. 01 05568 in the name of THOMSON Licensing S.A. This variant will be set forth more briefly in the embodiments described subsequently.

The data packets such as the packet 60 are received by the receiver device 2 which methods the LECM messages in a terminal module 22 of the smart card 21. The terminal module 22 contains the secret key of the network Kn and is thus capable of decrypting the protected part of the LECM messages. With the aid of the content of these decrypted messages, the receiver device recovers the control words CW that have served to scramble the "useful" data 62 and is thus able to descramble these data so as to present them to a user.

It will be noted that the recording device 3 receives the data to be recorded in the form of the packets 60 containing the scrambled data.

Of course, a domestic digital network may contain several source devices, several receiver devices and several recording devices. In this case, all the converters of the source devices have to contain the secret key Kn of the network so as to generate the LECM messages and all the terminals of the receiver devices have to contain the key Kn to decrypt the protected part of the LECM messages.

Moreover a domestic digital network may evolve. The user may thus add appliances to or remove them from the network. It may be necessary to change the key of the network Kn or to use a new encryption algorithm, in particular when the security of the system is compromised.

According to the principle of the invention, each terminal module of a receiver device holds all the keys $Kn[i]$ that have been used since the creation of the domestic digital network. Among them, a single key is "active"; in what follows it will be denoted $Kn[0]$. On the other hand the converter modules of the source devices contain only this active network key $Kn[0]$.

Thus, the data recorded earlier in the network may still be read by the reception devices that possess all the keys used to encrypt the LECM messages since the creation of the network. As far as they are concerned, the source devices need only the active key $Kn[0]$ in order to generate LECM messages for new data entering the network.

It will be noted in this regard that the digital data entering the network are not necessarily in the form described above (data scrambled with control words contained in encrypted form in ECM messages) but regardless of the form in which the source device receives the data from outside the network, it dispatches them over the network in the form of packets such as that represented in FIG. 2. If need be, the source device itself generates the control words and it scrambles the data with the aid of these control words before sending them in the protected part of the LECM message.

As was seen above, all the receiver devices possess (in their terminal module) all of the keys $Kn[i]$. When a new receiver device is connected to the network, it receives all these keys from a particular receiver device of the network, the progenitor, which also indicates which key is active.

Each receiver device can in fact be in one of the following states: Virgin, Progenitor or Sterile.

A Virgin receiver device is defined by the fact that it does not comprise the keys of the network $Kn[i]$. This is typically a device which is not yet linked to the network. This is the default state of a receiver device.

A Sterile device is defined by the fact that it possesses the keys of the network $Kn[i]$, but that it cannot send them to another device.

An Progenitor device is defined by the fact that it possesses the keys of the network $Kn[i]$, and that it can send them to other devices of the network. There exists only one progenitor device in the network.

The state of a receiver device is stored by a state indicator, for example a register located in the terminal module 22 of the receiver device.

Further details regarding the manner of creating a new network and the manner of exchanging the keys between the devices when new devices are connected to the network will be found in the aforesaid patent applications (Application FR-A-2 792 482 in the name of THOMSON multimedia and Application FR No. 01 05568 in the name of THOMSON Licensing S.A.).

When a new source device is connected to the network, the progenitor receiver device sends it only the active network key $Kn[0]$. The key $Kn[0]$ is then stored in the converter module of the new source device. In the embodiment variant using a more complex system for managing keys, the source device does not receive the active network key itself but an information item based on this key. More precisely, as set forth in the aforesaid Application FR No. 01 05568, the new source device generates a symmetric encryption key Kc which is used subsequently to encrypt the data to be protected of the LECM message. It sends this symmetric key Kc in a secure manner to the progenitor receiver device of the network which sends it back the key Kc encrypted with the active network key $Kn[0]$. The new source device subsequently stores the result of this encryption $E_{Kn[0]}(Kc)$ in its converter module. When this new receiver device subsequently transmits data in the network, it will include in the unenciphered part 610 of the LECM messages the encryption $E_{Kn[0]}(Kc)$ of the symmetric key Kc with the active network key $Kn[0]$.

When a receiver device receives data to be presented to a user, these data being sent in the form of packets 60 each containing scrambled data and an LECM message, the receiver device must firstly determine the key $Kn[i]$ with which the data of the LECM message have been encrypted.

This may be performed by an exhaustive trial of all the keys stored in the terminal module of the receiver device (embodiment B described hereinbelow), or by the use of an index (embodiment C described hereinbelow), or else, preferably, by the use of key fingerprints contained in the LECM message (embodiment A described hereinbelow).

A] Use of Fingerprints

In this embodiment it is assumed that each receiver device contains a table stored in its terminal module such as the table 1 hereinbelow in which:
the "Key" column contains each of the N secret keys of the network which has been or is active in the network; the active network key is the key $Kn[0]$. The field containing the key has a fixed size, large enough to take account of future alterations to the sizes of keys, but the keys stored may have a smaller size than the size of the field;
the "H(Key)" column contains the result of a one-way function H applied to each of the keys $Kn[i]$; the hash function SHA-1 will preferably be used;
the "@processing_function" column contains a pointer to a processing function contained in software embedded in the smart card containing the terminal module.

TABLE 1

| Key | H(Key) | @processing_function |
|---|---|---|
| Kn[0] | H(Kn[0]) | @processing_function [0] |
| ... | ... | ... |
| Kn[i] | H(Kn[i]) | @processing_function [i] |
| ... | ... | ... |
| Kn[N] | H(Kn[N]) | @processing_function [N] |

According to this embodiment, when a new source device is linked to the network, the progenitor receiver device sends it the active network key $Kn[0]$. The key $Kn[0]$ is stored in the converter module of the source device and the converter module calculates, with the aid of the aforesaid one-way function H, the fingerprint H(Kn[0]) of this key.

All the converter modules of the source devices of the network therefore possess the key Kn[0] and its fingerprint H(Kn[0]).

When a converter module of a source device has to generate a new LECM message to send new data over the network, it uses the active key Kn[0] to encrypt the data of the protected part of the LECM message (in particular to encrypt the control word CW) and it inserts the fingerprint H(Kn[0]) of the active key into the part of the LECM message containing the unenciphered data.

In the embodiment variant using a more complex system for managing keys, the source device does not receive the active network key Kn[0] itself but an information item based on this key ($E_{Kn[0]}(Kc)$). It furthermore receives, according to this embodiment A, the fingerprint H(Kn[0]) of the active key which it stores in its converter module. When it generates a new LECM message, the converter module encrypts the data of the part to be protected with the symmetric encryption key Kc and it inserts into the unenciphered part of the LECM message the fingerprint H(Kn[0]) of the active key and the encryption of the key Kc with the aid of this active key Kn[0].

As the network evolves over time and new keys are used in the guise of active network key, the data recorded in the network contain LECM messages encrypted with various keys used in succession in the guise of active network key.

When the user wishes to play back previously recorded data on a receiver device, the terminal module of the receiver device receives LECM messages which it has to decrypt using the right key stored in Table 1. To do this, the terminal module firstly extracts from the unenciphered part of the LECM message the fingerprint H(Kn[j]) of the key used to encrypt the data of the protected part of the LECM message. It subsequently compares this fingerprint H(Kn[j]) with all those stored in Table 1 and, if a value corresponds, it then calls the function situated at the address @processing_function [j] which performs the decryption of the protected part of the LECM message with the aid of the key Kn[j].

If conversely no fingerprint corresponds in Table 1, this signifies that the data received has not been recorded in the domestic network. The LECM message cannot therefore be decrypted and the corresponding data cannot be descrambled.

It will be noted that the various processing functions used may not only use different encryption algorithms but also perform other processing on the data.

For example, when the protected part of the LECM message is encrypted with the aid of a symmetric key Kc as described hereinabove in an embodiment variant, the processing function firstly performs the decryption of the information item $E_{Kn[0]}(Kc)$, extracted from the unenciphered part of the LECM message, so as to recover the key Kc before decrypting the data protected with this key Kc.

B] Systematic Trial of the Keys

According to this embodiment, each terminal module of the receiver devices contains the list of keys Kn[0], . . . , Kn[i], . . . , Kn[N] which have been used in the network since its creation.

Each converter module of a source device contains the active network key Kn[0]. When it has to generate an LECM message, the converter encrypts the data to be protected with the key Kn[0]. It also calculates the result of a one-way function, in particular a "CRC" (standing for "Check Redundancy Code"), on all or part of the unenciphered data of the LECM message and it encrypts this CRC with the key Kn[0], the result of this encryption being inserted into the protected part of the LECM message.

When a terminal module of a receiver device receives an LECM message to be decrypted, it systematically performs a decryption of the data contained in the protected part of the LECM message with the aid of each key Kn[i] stored in the terminal module. It also calculates the CRC from the data contained in the unenciphered part of the LECM message and it then compares each result of decryption of the CRC with that calculated from the unenciphered data. When the result is identical this signifies that the key used to decrypt is that which served to encrypt the LECM message.

The terminal module is therefore able to recover the protected data (including the control words) of the LECM message and to descramble the data and present them to the user.

When the abovementioned embodiment variant with a more complex system for managing keys is used, the converter module of the source device encrypts the data to be protected of the LECM message (including the result of the CRC) with the symmetric key Kc and it inserts into the unenciphered part of the LECM message the encryption of the key Kc with the aid of the active network key Kn[0].

The terminal module of a receiver device which receives such an LECM message performs the same operations as those described above but with an additional step, that is to say it firstly performs a decryption of the item EKn[ ](Kc), extracted from the unenciphered part of the LECM message, with the aid of a first key Kn[i] so as to recover the assumed key Kc. It then tries to decrypt the protected part of the LECM message with this key Kc. If the key Kn[i] corresponds to that which was used to encrypt the key Kc, then the CRC retrieved from the protected part of the data will correspond to the CRC calculated on the unenciphered part of the data. Otherwise, the terminal module continues by trying another key Kn[i+1].

C] Use of an Index

According to this embodiment, each terminal module of the receiver devices possesses a large-size random number called "Key_space". This number is preferably created on initializing the system, for example when the smart cards containing the terminal modules are created.

All the successive keys Kn[i] used in the network are extracted from this number Key_space:

either each key represents a subset of the number Key_space;

or each key is the result of a calculation performed on the basis of the number Key_space or of a part of this number.

In this embodiment it is assumed moreover that each receiver device contains a table stored in its terminal module, such as Table 2 hereinbelow containing indices and, for each index, a pointer to a processing function contained in software embedded in the smart card containing the terminal module.

TABLE 2

| Index | @processing_function |
|---|---|
| [0] | @processing_function[0] |
| . . . | . . . |
| [i] | @processing_function[i] |
| . . . | . . . |
| [N] | @processing_function[N] |

Each index of Table 2 corresponds to the use of a different key Kn[i] and the processing function situated at the address @processing_function[i] makes it possible to extract this key on the basis of the number Key_space.

The converter modules situated in the source devices contain the active network key Kn[0] and the corresponding index [0]. When they generate an LECM message, they use the key Kn[0] to encrypt the data of the protected part and they insert the index [0] into the unenciphered part of the LECM message.

Therefore, when a terminal module receives an LECM message, it will read from the unenciphered part the index [i] contained therein and it calls the function situated at the address @processing_function[i] to calculate the key Kn[i] which was used to encrypt a part of the LECM message. It can then decrypt the protected part of the LECM message by virtue of this key Kn[i].

In the embodiment variant using management of more complex keys, the converter modules encrypt the data to be protected of the LECM messages with the symmetric key Kc and insert into the unenciphered part of the LECM messages: the index [0] of the active key and the encryption of the key Kc with the active network key Kn[0]. The terminal module which receives such a message recovers as hereinabove the key Kn[0] with the aid of the index [0] extracted from the unenciphered part of the message. It can then retrieve the key Kc by decrypting the item $E_{Kn[0]}(Kc)$ and then decrypt the protected data with the aid of Kc.

By virtue of the invention, it is possible to make alterations to domestic digital networks while still guaranteeing protection against illicit copying and enabling honest users to read out the data recorded in the past.

The invention claimed is:

1. A method for processing encrypted data in a receiver device linked to a domestic digital network further comprising a source device and a recording device, wherein the receiver device stores a network active decryption key and all decryption keys of the domestic digital network used since a creation of the domestic network and furthermore stores a fingerprint of each stored decryption, each fingerprint being calculated with an aid of a one-way function applied to one of said stored decryption keys, the method comprising, in the receiver device:
receiving the encrypted data from the source device or the recording device, the encrypted data comprising data encrypted by the source device using a symmetric encryption process with a network active encryption key and a key fingerprint corresponding to the network active encryption key;
extracting said key fingerprint from the data received;
comparing the extracted fingerprint with the stored fingerprints; and
in case of equality between the extracted fingerprint and a stored fingerprint, decrypting the encrypted data with the key corresponding to said fingerprint.

* * * * *